United States Patent
Yang et al.

(10) Patent No.: US 12,026,171 B2
(45) Date of Patent: Jul. 2, 2024

(54) METHOD AND SYSTEM OF MANAGING ERROR DATA ASSOCIATED WITH A VEHICLE

(71) Applicant: TuSimple, Inc., San Diego, CA (US)

(72) Inventors: YiXin Yang, San Diego, CA (US); Dinghua Li, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 271 days.

(21) Appl. No.: 16/013,369

(22) Filed: Jun. 20, 2018

(65) Prior Publication Data

US 2019/0392042 A1 Dec. 26, 2019

(51) Int. Cl.
*G06F 16/25* (2019.01)
*G06F 3/0482* (2013.01)
*G06F 16/23* (2019.01)

(52) U.S. Cl.
CPC .......... *G06F 16/252* (2019.01); *G06F 3/0482* (2013.01); *G06F 16/2379* (2019.01)

(58) Field of Classification Search
CPC ... H04L 41/0677; H04L 41/069; H04L 67/12; G06F 15/252; G06F 16/2379; G06F 3/0482; G06F 16/252
See application file for complete search history.

(56) References Cited

U.S. PATENT DOCUMENTS

| | | | | |
|---|---|---|---|---|
| 5,729,452 A | * | 3/1998 | Smith | G01M 15/102 701/33.6 |
| 8,126,642 B2 | * | 2/2012 | Trepagnier | G01S 17/86 701/423 |
| 8,311,858 B2 | * | 11/2012 | Everett | G07C 5/008 705/4 |
| 8,744,668 B2 | * | 6/2014 | Selkirk | G07C 5/0808 340/439 |
| 8,818,618 B2 | * | 8/2014 | Follmer | G06Q 10/10 701/33.4 |

(Continued)

FOREIGN PATENT DOCUMENTS

| CN | 108647437 A | 10/2018 |
|---|---|---|
| CN | 108921971 A | 11/2018 |

(Continued)

OTHER PUBLICATIONS

Gao et al., "Vehicle Identification and GPS Error Detection from a LIDAR Equipped Probe Vehicle;" Proceedings of the IEEE ITSC 2006; 2006 IEEE Intelligent Transportation Systems Conference, Toronto, Canada, Sep. 17-20, 2006 (Year: 2006).*

*Primary Examiner* — Van H Oberly
(74) *Attorney, Agent, or Firm* — Perkins Coie LLP (57) ABSTRACT

Systems and methods of managing error data associated with a vehicle to provide a more user-friendly vehicle error data system. A method of managing error data associated with a vehicle incorporates storing error data in a memory; categorizing the error data via topics or time frame via a processor coupled to the memory; analyzing the error data to result in at least one topic thread or a time thread; selecting desired error data in response to selection of the desired error data from the error data by a user; converting the desired error data into readable information via the processor; and displaying the readable information via a user interface providing a human-machine interaction.

18 Claims, 9 Drawing Sheets

(56) References Cited

U.S. PATENT DOCUMENTS

| | | | | |
|---|---|---|---|---|
| 8,914,187 B2* | 12/2014 | Wang | | H04M 1/72409 |
| | | | | 701/32.7 |
| 8,930,067 B1* | 1/2015 | Green | | H04W 12/084 |
| | | | | 705/7.41 |
| 8,977,284 B2* | 3/2015 | Reed | | H04W 4/023 |
| | | | | 455/456.1 |
| 9,262,254 B2* | 2/2016 | Bertosa | | H04L 67/12 |
| 9,288,270 B1* | 3/2016 | Penilla | | G06Q 20/308 |
| 9,360,450 B2* | 6/2016 | Komatsu | | G01N 27/4165 |
| 9,642,024 B2* | 5/2017 | Reed | | H04B 17/318 |
| 10,037,689 B2* | 7/2018 | Taylor | | G06K 7/10475 |
| 10,144,389 B2* | 12/2018 | Archer | | B60R 25/08 |
| 10,332,320 B2* | 6/2019 | Lakshamanan | | G06N 20/00 |
| 10,390,175 B2* | 8/2019 | Reed | | G01S 5/0252 |
| 2001/0033225 A1* | 10/2001 | Razavi | | G01C 21/26 |
| | | | | 340/425.5 |
| 2002/0154003 A1* | 10/2002 | Ueda | | B60K 35/00 |
| | | | | 715/764 |
| 2002/0193925 A1* | 12/2002 | Funkhouser | | G07C 5/0808 |
| | | | | 701/31.8 |
| 2004/0167689 A1* | 8/2004 | Bromley | | G07C 5/008 |
| | | | | 701/29.6 |
| 2005/0137757 A1* | 6/2005 | Phelan | | G07C 5/02 |
| | | | | 701/1 |
| 2006/0025894 A1* | 2/2006 | O'Connor | | G01C 21/20 |
| | | | | 701/1 |
| 2006/0180371 A1* | 8/2006 | Breed | | G07C 5/008 |
| | | | | 180/197 |
| 2007/0288134 A1* | 12/2007 | Rollinger | | F02D 41/222 |
| | | | | 701/32.8 |
| 2011/0035137 A1* | 2/2011 | Konishi | | F02N 11/0818 |
| | | | | 701/115 |
| 2012/0131004 A1* | 5/2012 | McDermott | | G06Q 30/02 |
| | | | | 707/736 |
| 2013/0013348 A1* | 1/2013 | Ling | | G06Q 40/08 |
| | | | | 705/4 |
| 2013/0031318 A1* | 1/2013 | Chen | | B60L 3/0069 |
| | | | | 711/E12.001 |
| 2014/0075362 A1* | 3/2014 | Gray | | G07C 5/0808 |
| | | | | 715/772 |
| 2014/0137163 A1* | 5/2014 | Tsai | | H04N 21/41422 |
| | | | | 725/75 |
| 2014/0278020 A1* | 9/2014 | Neet | | F02N 11/087 |
| | | | | 701/112 |
| 2014/0320653 A1* | 10/2014 | Bourgeois | | H04N 7/183 |
| | | | | 348/148 |
| 2015/0309859 A1* | 10/2015 | Elzein | | H04L 41/0873 |
| | | | | 714/49 |
| 2015/0363606 A1* | 12/2015 | Nairn | | H04L 63/1491 |
| | | | | 701/32.6 |
| 2016/0035147 A1* | 2/2016 | Huang | | H04L 9/3271 |
| | | | | 701/31.4 |
| 2017/0039765 A1* | 2/2017 | Zhou | | G06T 19/006 |
| 2017/0063566 A1* | 3/2017 | Seminario | | H04L 12/2816 |
| 2017/0074659 A1* | 3/2017 | Giurgiu | | G01S 19/07 |
| 2017/0161965 A1* | 6/2017 | Du | | G07C 5/008 |
| 2017/0197617 A1* | 7/2017 | Penilla | | G08G 1/0129 |
| 2018/0095638 A1* | 4/2018 | Merg | | G06F 3/0482 |
| 2019/0052522 A1* | 2/2019 | Makkiya | | H04L 41/069 |

FOREIGN PATENT DOCUMENTS

| | | | | |
|---|---|---|---|---|
| CN | 109147091 A | | 1/2019 | |
| CN | 109204324 A | | 1/2019 | |
| EP | 1005627 A2 * | | 6/2000 | G01C 21/3415 |
| EP | 3462269 A1 | | 4/2019 | |

* cited by examiner

110
Store error data in a memory

120
Categorize the error data via topic or time frame via a processor coupled to the memory

130
Analyzing the error data into at least one topic thread or a time thread

135
Analyzing the at least one topic thread by an algorithm

140
Select desired error data from the error data

FIG. 1A

150 Convert the desired error data into readable information via the processor

164 Select a stop button or a pause button in a user interface

162 Select a start button in a user interface

166 Regenerate the readable information via the processor

METHOD AND SYSTEM OF MANAGING ERROR DATA ASSOCIATED WITH A VEHICLE

TECHNICAL FIELD OF THE INVENTION

The present application generally relates to error data system, and more particularly, to a method and a system of managing error data associated with a vehicle.

BACKGROUND OF THE INVENTION

A traditional vehicle error data system may collect and save error data in a single file. However, when the user would like to playback the specific error data, there is no easy way to read the only desired specific error data since the error data are played in chronological order and only can be read from the beginning. In addition, there is no user interface in traditional error data system, making visualization be impossible.

Therefore, a need remains for a method and a system of managing error data associated with a vehicle to provide a more user friendly and visible vehicle error data system which allows the user to read and watch the only desired portion.

SUMMARY OF THE INVENTION

The present application discloses a method and a system of managing error data associated with a vehicle to provide a more user friendly and visible vehicle error data system which allows the user to read and watch the only desired portion.

The method of managing error data associated with a vehicle, comprising: storing error data in a memory; categorizing the error data via topic or time frame via a processor coupled to the memory; analyzing the error data into at least one topic thread or a time thread; selecting desired error data from the error data; converting the desired error data into readable information via the processor; and displaying the readable information via a user interface.

According to an exemplary embodiment of the method of managing error data associated with a vehicle, wherein after analyzing the error data into at least one topic thread or a time thread, the method further comprises analyzing the at least one topic thread by an algorithm.

In various exemplary embodiments, after converting the desired error data into the readable information via the processor, the method further comprises selecting a start button in the user interface.

In various exemplary embodiments, after displaying the readable information via the user interface, the method further comprises selecting a stop button or a pause button in the user interface; and regenerating the readable information via the processor.

In various exemplary embodiments, after displaying the readable information via the user interface, the method further comprises selecting a repeat button in the user interface; and displaying the readable information via the user interface again.

The present application also discloses the system of managing error data associated with a vehicle, comprising a memory, a processor and a user interface. The memory stores error data. The processor is coupled to the memory and configured to categorize the error data via topics or time frame, the error data is analyzed into at least one topic thread or a time thread according to topics or time frame via the processor, wherein desired error data are selected from the error data and are converted into readable information. The user interface is coupled to the processor and is capable of displaying the readable information.

In various exemplary embodiments, the user interface comprises a start button, a stop button, a play button, a pause button and a repeat button. The processor is configured to regenerate the readable information after selecting the pause button. The user interface is configured to display the readable information after selecting the start button.

In various exemplary embodiments, the user interface comprises a start button, a stop button, a play button, a pause button and a repeat button. The user interface is configured to display the readable information again after selecting the repeat button.

In various exemplary embodiments, the user interface comprises a start button, a stop button, a play button, a pause button and a repeat button. The desired error data are all of the error data, the user interface is configured to display the readable information chronologically after selecting the play button and the processor is configured to regenerate the readable information after selecting the stop button.

In various exemplary embodiments, the processor is capable of analyzing the at least one topic thread or the time thread by an algorithm.

Based on the above, the present application allows users to select the desired portion from the error data for reviewing since the error data are analyzed according to different topics or time. Therefore, the user can select the desired topic or specific time to review rather than review everything chronologically.

In addition, compared to the traditional error data system which the user cannot review the information from the error data directly but need to connect other devices for reviewing, the user interface of the present application also provides a human-machine interaction, allowing the user to review the desired portion from the error data.

Numerous other advantages and features of the present application will become readily apparent from the following detailed description of disclosed embodiments, from the claims and from the accompanying drawings.

BRIEF DESCRIPTION OF THE DRAWINGS

The objects, features and advantages of the present application will be more readily appreciated upon reference to the following disclosure when considered in conjunction with the accompanying drawings, wherein like reference numerals are used to identify identical components in the various views, and wherein reference numerals with alphabetic characters are utilized to identify additional types, instantiations or variations of a selected component embodiment in the various views, in which.

DETAILED DESCRIPTION OF DISCLOSED EMBODIMENTS

Reference will now be made in detail to the present representative embodiments of the present application, examples of which are illustrated in the accompanying drawings. Wherever possible, the same reference numbers are used in the drawings and the description to refer to the same or like parts.

Figure 1A:
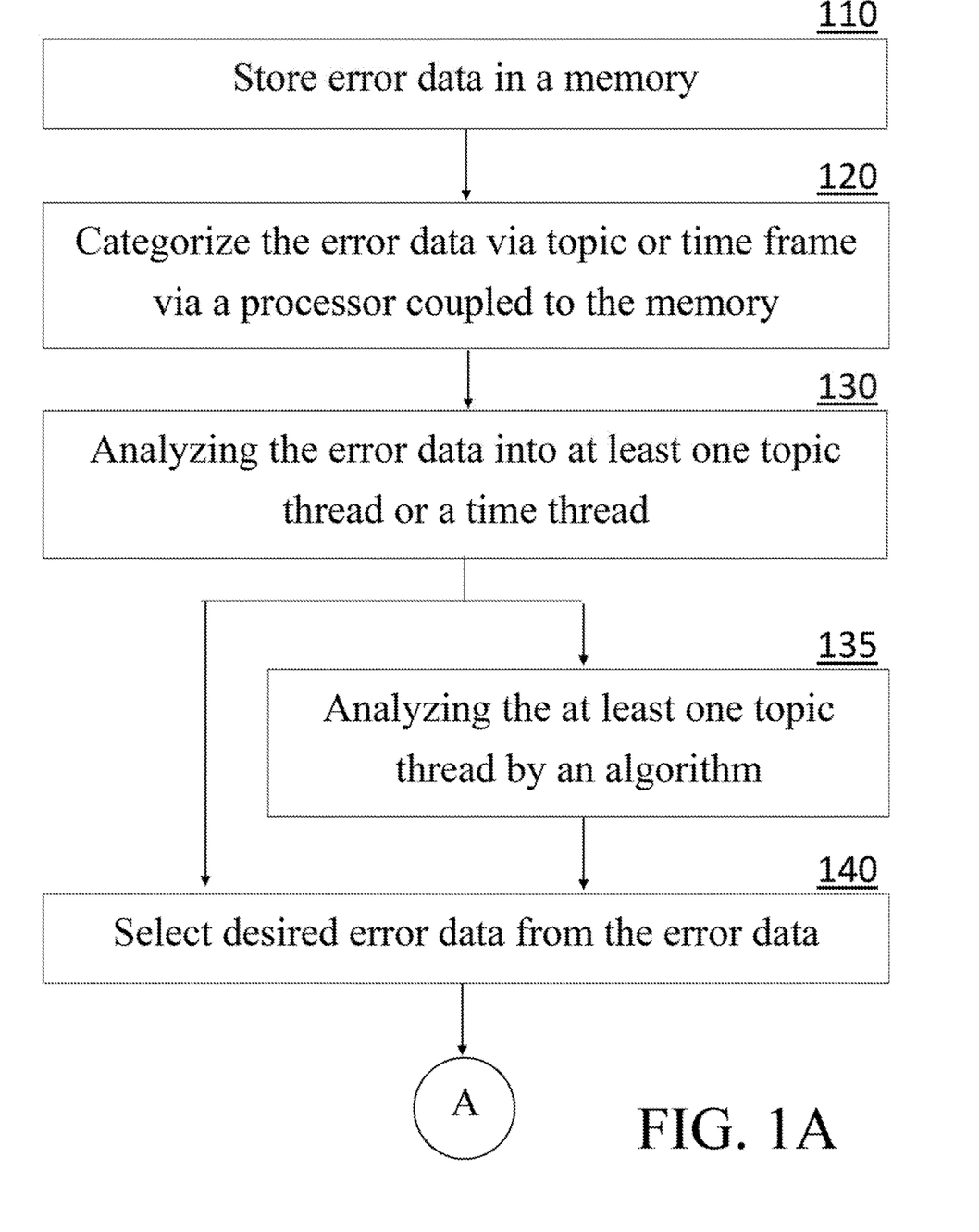
FIGS. 1A-1C are flow charts of a method of managing error data associated with a vehicle.
Figure 1B:
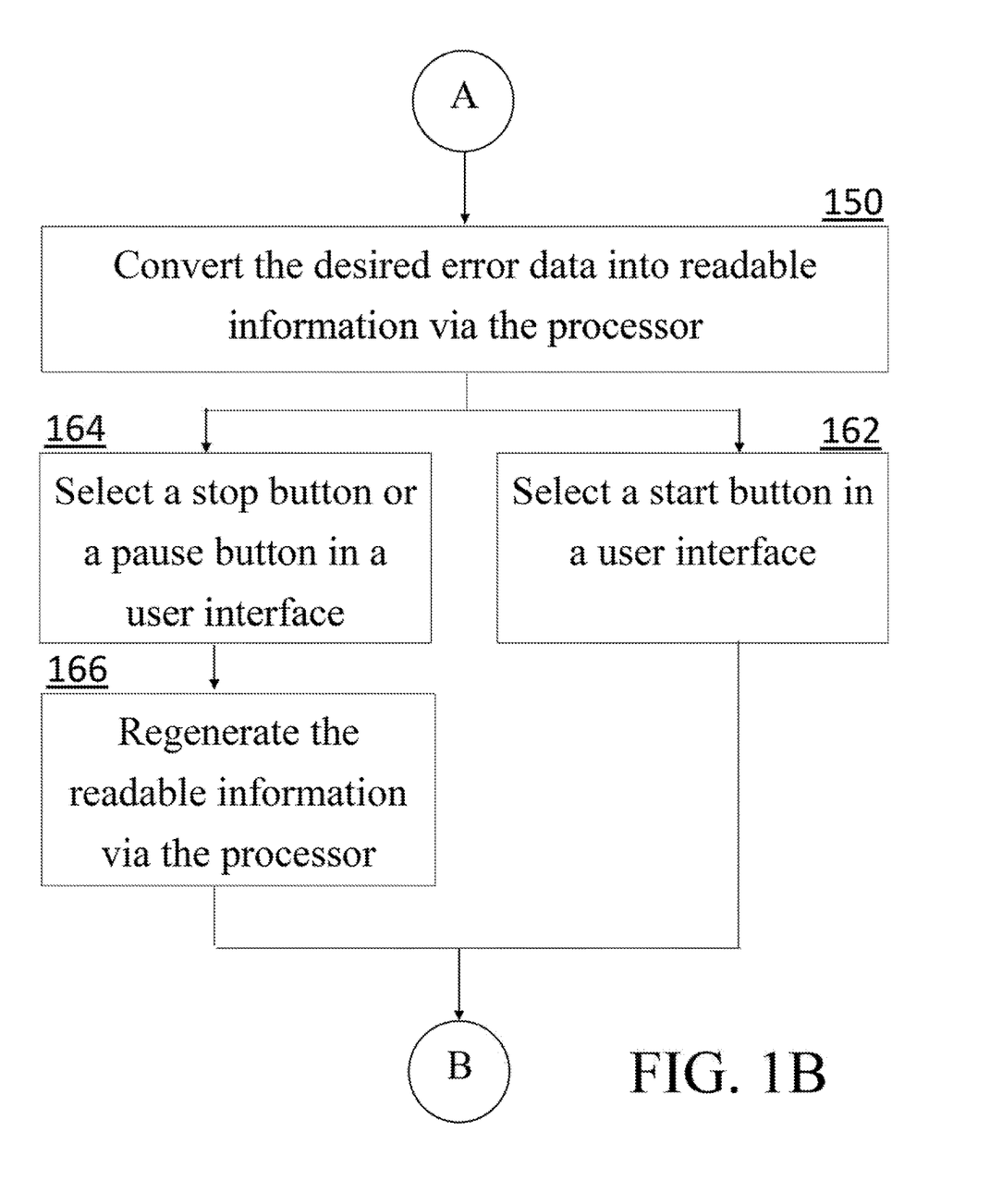
Figure 1C:
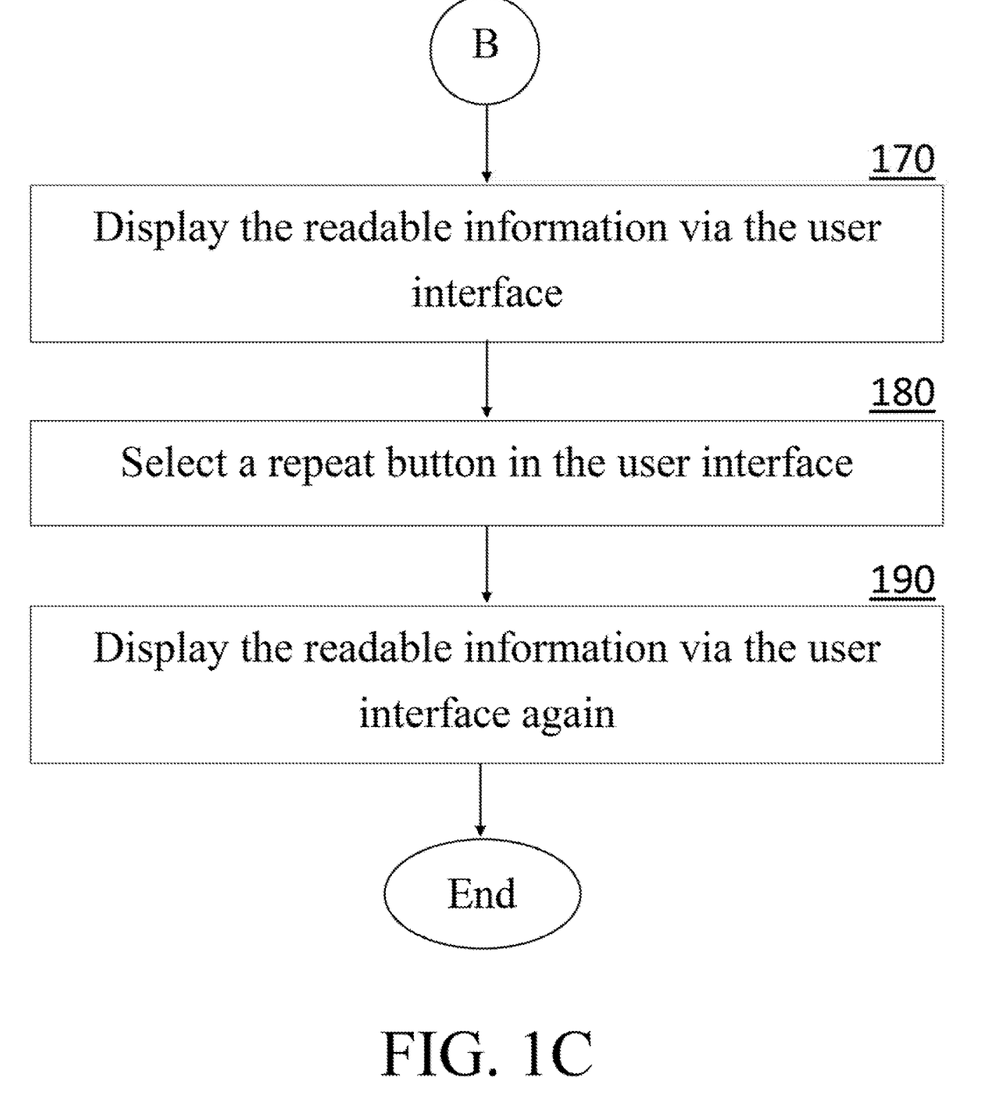
Figure 2:
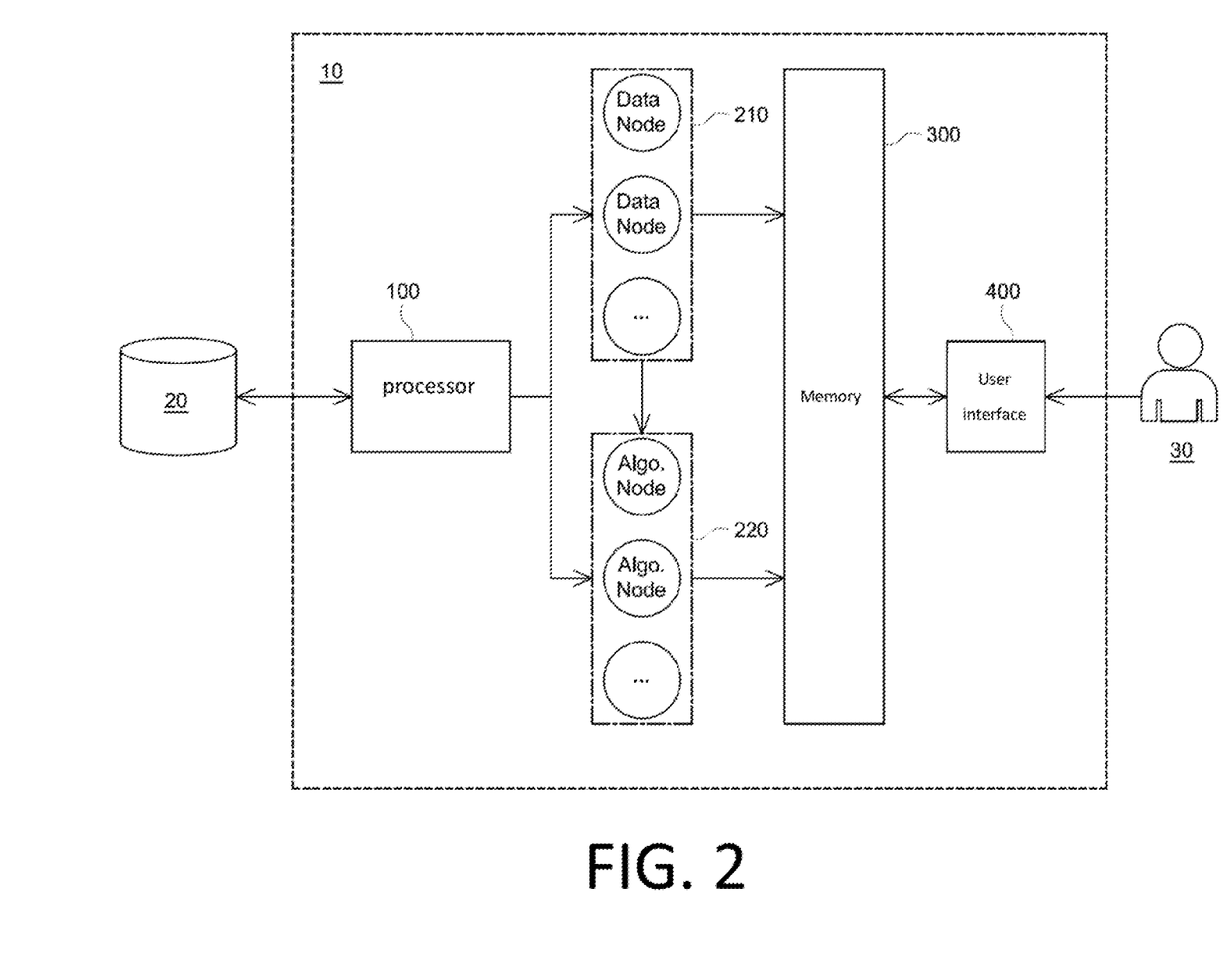
FIG. 2 is a diagram showing the system of managing error data associated with the vehicle.
Figure 3:
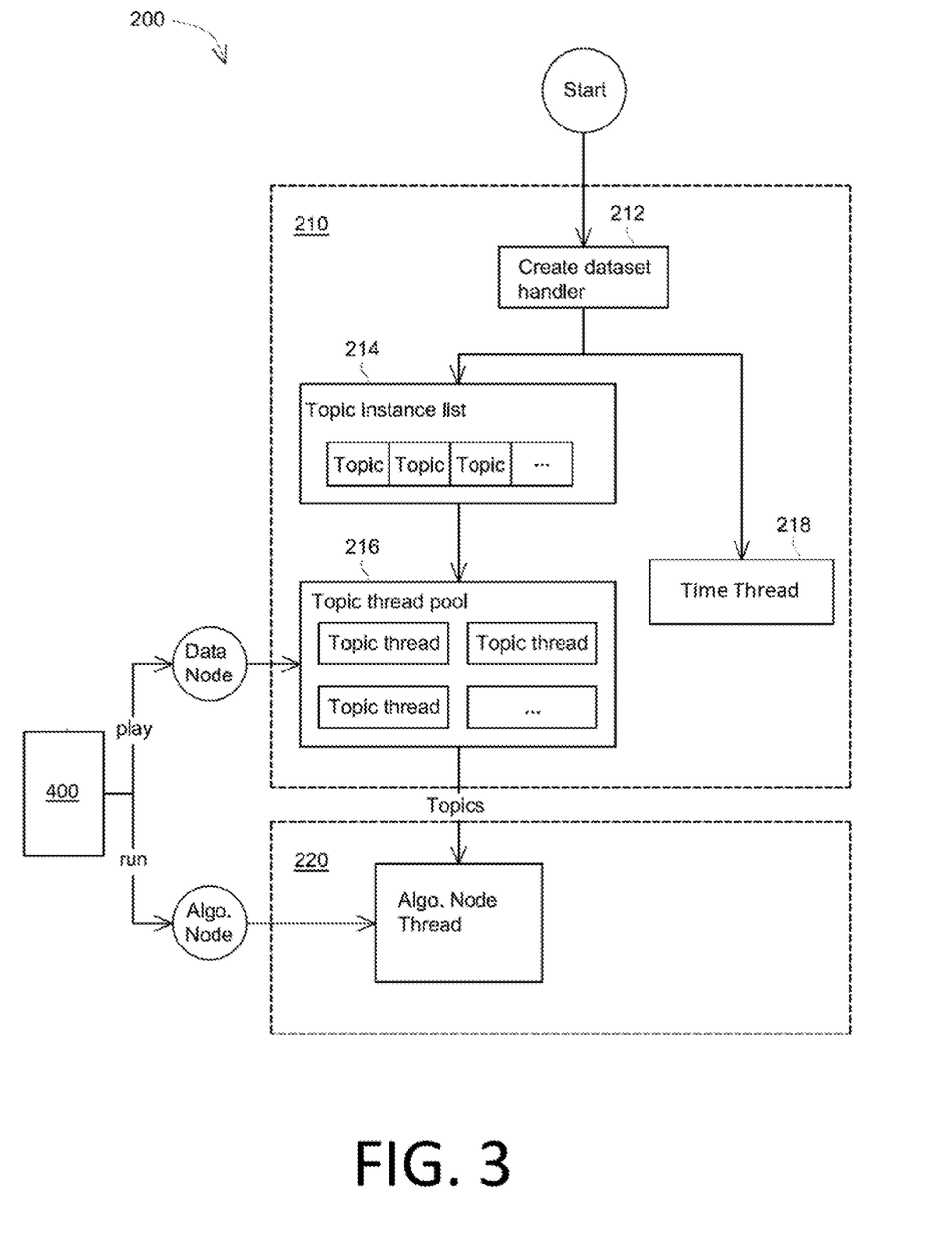
FIG. 3 is another diagram showing the system of managing error data associated with the vehicle.
Figure 4:
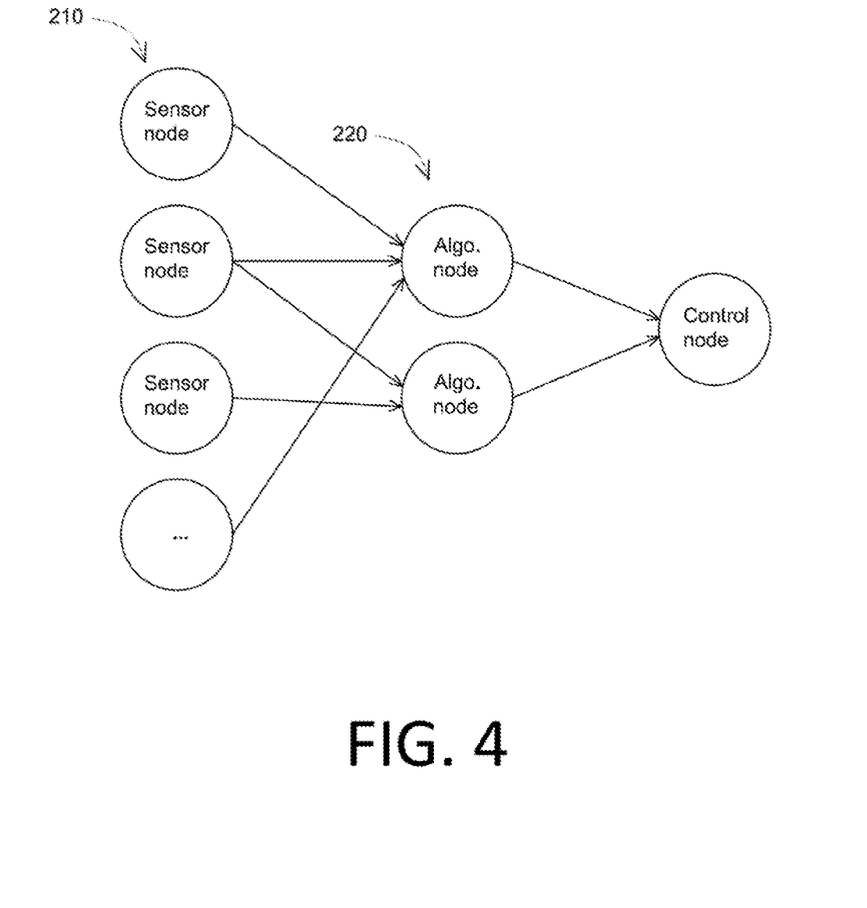
FIG. 4 is the other diagram showing the system of managing error data associated with the vehicle.

FIGS. 1A-1C are flow charts of a method of managing error data associated with a vehicle. FIGS. 2-4 are diagrams showing the system of managing error data associated with the vehicle.

Generally, the vehicle may record the system error while driving. The system error may be stored by the vehicle error data system. If the user would like to track the error, it is required to provide the error data to the professional staff or other analyzing devices to see what the problem is when utilizing the traditional vehicle error data system. In addition, it is also necessary to read all error data since the traditional vehicle error data system generally plays data in chronological order.

However, the present application provides two different ways for the user to read the error data. Referring to FIG. 2, a vehicle system 10, a memory 20 and a user 30 may involve in the system of managing error data associated with the vehicle.

The memory 20 may store error data. The vehicle system 10 comprises a processor 100, a memory 300 and a user interface 400. The processor 100 of the vehicle system 10 is coupled to the memory 20.

Referring to FIG. 1 and FIGS. 2-4, as shown in step 110, the error data may be stored in the memory 20 when driving the vehicle. After that the processor 100 may categorize the error data according to different topics or time frame as shown in step 120. Specifically, referring to FIG. 3, the processor 100 of the vehicle system 10 may analyze error data according to a topic/time analyzing mode 210 or an algorithm analyzing mode 220.

The first step in the topic analyzing mode 210 is creating dataset handler 212. After that, the vehicle system 10 may separate different issues into two different ways, topic analyzing mode or time analyzing mode. As shown in step 130 in FIG. 1A, if the vehicle system 10 proceeds the topic analyzing mode, the processor 100 then may create a topic instance list 214 and analyze the error data into at least one topic thread 216. Or, if the vehicle system 10 proceeds the time analyzing mode, the processor 100 then may analyze the error data into a time thread 218. As shown in FIG. 2, the analyzed information may be stored in the memory 300 after analyzing.

Referring to FIG. 1A, FIG. 3 and FIG. 4, as shown in step 135, the at least one topic thread 216 may further be analyzed by an algorithm if the error data cannot be analyzed via topic or time directly. Specifically, as shown in FIG. 3, sensor nodes can be integrated into algorithm nodes, allowing the processor 100 to analyze the error data according to the algorithm which collects multiple error data from different topics. In addition, if there are bugs in the error data collected from the sensor nodes, the algorithm may also debug and provide a debugged error data to be stored in the memory 300. Briefly speaking, the error data may be analyzed directly via the algorithm if the error data cannot be analyzed via topic/time or comprises bugs. As shown in FIG. 2, the analyzed information may be stored in the memory 300 after analyzing by the algorithm.

As shown in step 140 in FIG. 1A and step 150 in FIG. 1B, the user then may select the desired error data from the error data, the processor 100 may convert the desired error data into readable information according to topic thread 216 or time thread 218.

Figure 5A:
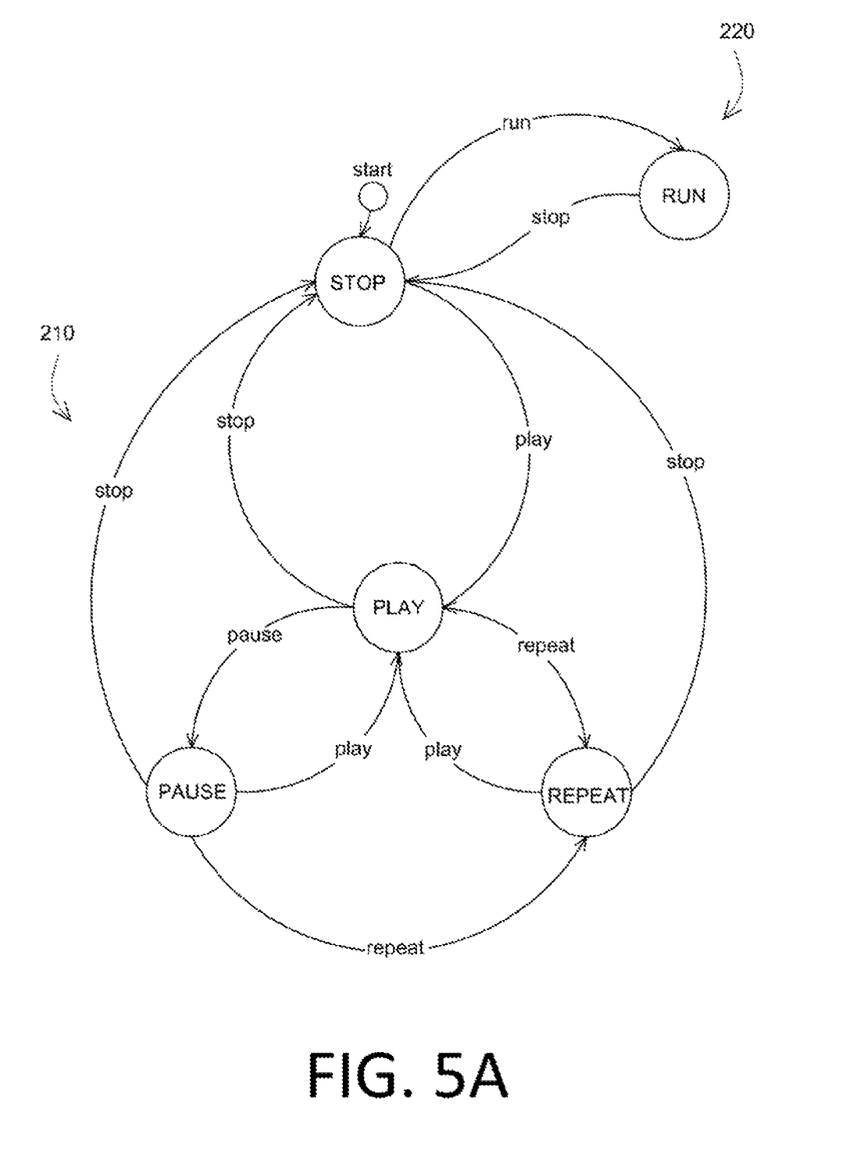
FIGS. 5A-5C are diagrams showing mechanism of a user interface of the system.
Figure 5B:
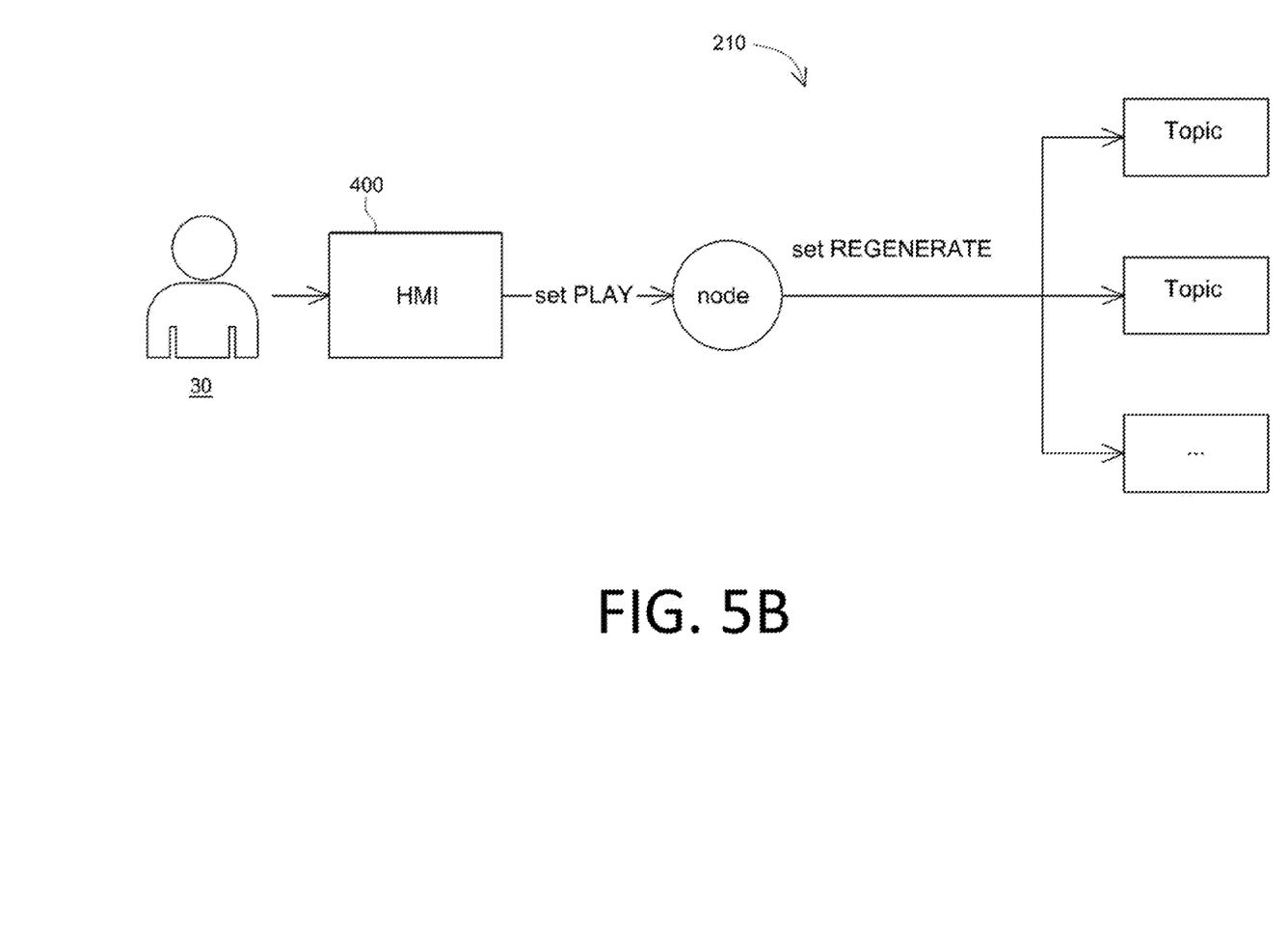
Figure 5C:
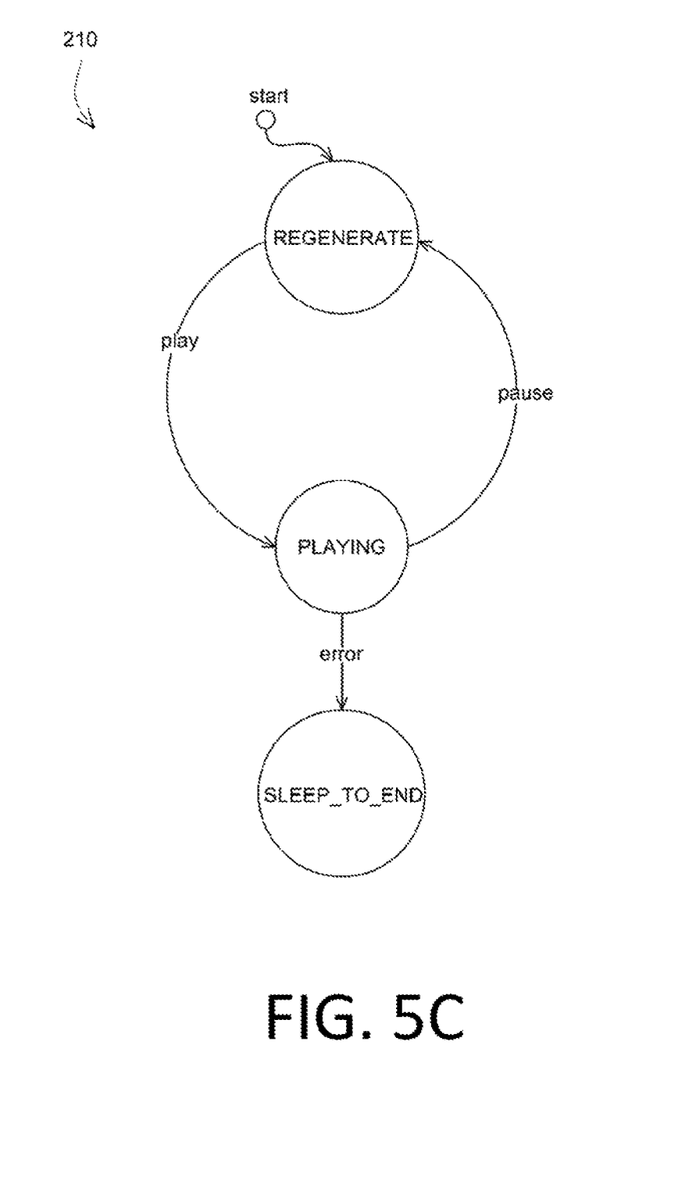

FIGS. 5A-5C are diagrams showing mechanism of a user interface of the system.

Referring to FIG. 1B and FIGS. 5A-5C, the user interface 400 may comprise a start button, a stop button, a play button, a pause button and a repeat button. As shown in step 162 and step 170, when selecting the start button, the user interface 400 may display the readable information. In addition, when selecting the pause button as shown in step 164, the processor 100 may regenerate the readable information. After the user selects the play button, the user interface 400 may continue the readable information from where it was interrupted as shown in step 170.

In another way, when selecting the stop button in the user interface 400 as shown in step 164, the processor 100 may also regenerate the readable information again. However, the difference between the stop button and the pause button is that the processor may regenerate every error data after selecting the stop button, allowing the user interface 400 to display the whole readable information which is analyzed from every error data.

On the other hand, when selecting the play button, the whole readable information which is analyzed from every error data may also be displayed through the user interface 400 chronologically.

Referring to FIG. 1C and FIG. 5C, as shown in step 180 and step 190, when selecting the repeat button in the user interface 400, the user interface 400 may display the readable information again. However, when the vehicle system 10 detects something wrong, it may proceed the error mode to shut down the vehicle system 10.

Based on the above, the present application allows users to select the desired portion from the error data for reviewing since the error data are analyzed according to different topics or time. Therefore, the user can select the desired topic or specific time to review rather than review everything chronologically.

In addition, compared to the traditional error data system which the user cannot review the information from the error data directly but need to connect other devices for reviewing, the user interface of the present application also provides a human-machine interaction, allowing the user to review the desired portion from the error data.

It will be apparent to those skilled in the art that various modifications and variations can be made to the structure of the present application without departing from the scope or spirit of the present application. In view of the foregoing, it is intended that the present application cover modifications and variations of this application provided they fall within the scope of the following claims and their equivalents.

What is claimed is:

1. A method of managing error data associated with a vehicle, comprising:
 storing error data;
 determining a plurality of topic-wise portions of the error data based on a topic analyzing mode,
  wherein each of the plurality of topic-wise portions is categorized with a different topic according to a first analysis of the error data according to the topic analyzing mode;
 selecting a desired portion from the plurality of topic-wise portions of the error data for playback in response to a selection of one of five buttons on a user interface, wherein the five buttons include a start button, a stop button, a play button, a pause button and a repeat button;
 converting the desired portion of the error data into readable information; and displaying the readable information via the user interface,
wherein a selection of the start button on the user interface causes display of the readable information related to the desired portion of the error data;
wherein a selection of the stop button on the user interface causes regenerating the readable information based on all of a plurality of time-wise portions or the plurality of topic-wise portions of the error data;
wherein a selection of the play button causes display of the plurality of topic-wise portions;
wherein a selection of the repeat button causes display of the readable information via the user interface again, and
wherein a selection of the pause button causes regenerating the readable information.

2. The method of claim 1, comprising analyzing the error data to result in at least one topic thread of the error data and analyzing the at least one topic thread by an algorithm.

3. The method of claim 2, wherein the algorithm provides a debugged error data.

4. The method of claim 1, wherein the selection of the start button is received after the converting the desired portion of the error data into the readable information.

5. The method of claim 1, wherein the selection of the stop button or the pause button is received after the displaying the readable information via the user interface.

6. The method of claim 1, wherein the selection of the repeat button is received after the displaying the readable information via the user interface.

7. The method of claim 1, comprising creating a topic instance list.

8. The method of claim 1, wherein the plurality of topic-wise portions is determined further based on a second analysis according to an algorithm analyzing mode responsive to the error data comprising bugs.

9. The method of claim 8, wherein the second analysis of the error data is based on integrating a plurality of sensor nodes into a plurality of algorithm nodes.

10. The method of claim 1, further comprising:
determining the plurality of time-wise portions of the error data based on a time analyzing mode, wherein the plurality of time-wise portions includes a time thread that results from a second analysis of the error data in accordance with the time analyzing mode.

11. The method of claim 1, wherein the selection of the play button causes display of the plurality of topic-wise portions based on the selection of the play button occurring subsequent in time to the selection of the start button and the selection of the stop button.

12. A system for managing error data associated with a vehicle, comprising:
a memory storing error data;
a processor configured to:
determine a plurality of topic-wise portions of the error data based on a topic analyzing mode, wherein each of the plurality of topic-wise portions is categorized with a different topic according to a first analysis of the error data according to the topic analyzing mode; and
provide a desired portion that is selected from the plurality of topic-wise portions for display via a user interface, wherein the desired portion is selected from the plurality of topic-wise portions of the error data in response to a selection of one of five buttons on the user interface, wherein the five buttons include a start button, a stop button, a play button, a pause button and a repeat button;
convert the desired portion of the error data into readable information; and
display the readable information via the user interface,
wherein a selection of the start button on the user interface causes display of the readable information related to the desired portion of the error data;
wherein a selection of the stop button on the user interface causes the readable information to be regenerated based on all of a plurality of time-wise portions or the plurality of topic-wise portions of the error data;
wherein a selection of the play button causes display of the plurality of topic-wise portions;
wherein a selection of the repeat button causes display of the readable information via the user interface again, and
wherein a selection of the pause button causes the readable information to be regenerate.

13. The system as in claim 12, wherein, the user interface is configured to display the readable information in response to a selection of the start button.

14. The system as in claim 12, wherein the desired portion of the error data are all of the error data.

15. The system as in claim 12, wherein the processor is configured to analyze the error data to result in at least one topic thread of the error data and analyze the at least one topic thread or time thread by an algorithm.

16. The system of claim 15, wherein the algorithm provides a debugged error data.

17. The system of claim 12, wherein the processor is configured to create a topic instance list.

18. The system as in claim 12, wherein the user interface is configured to display the readable information chronologically in response to selecting the play button.

* * * * *